United States Patent
Kunimoto (10) Patent No.: US 9,161,173 B2
(45) Date of Patent: Oct. 13, 2015

(54) RADIO COMMUNICATION SYSTEM, LOCATION REGISTRATION METHOD, REPEATER, AND RADIO CLIENT DEVICE

(71) Applicant: Icom Incorporated, Osaka (JP)

(72) Inventor: Masahiko Kunimoto, Osaka (JP)

(73) Assignee: ICOM INCORPORATED, Osaka (JP)

( * ) Notice: Subject to any disclaimer, the term of this patent is extended or adjusted under 35 U.S.C. 154(b) by 4 days.

(21) Appl. No.: 14/224,681

(22) Filed: Mar. 25, 2014

(65) Prior Publication Data

US 2014/0370888 A1    Dec. 18, 2014

(30) Foreign Application Priority Data

Jun. 17, 2013  (JP) .................................. 2013-126428

(51) Int. Cl.
*H04B 3/36* (2006.01)
*H04W 4/02* (2009.01)
*H04W 16/26* (2009.01)
*H04W 60/00* (2009.01)
*H04B 7/155* (2006.01)

(52) U.S. Cl.
CPC ................. *H04W 4/028* (2013.01); *H04B 3/36* (2013.01); *H04W 16/26* (2013.01); *H04W 60/00* (2013.01); *H04B 7/15507* (2013.01)

(58) Field of Classification Search
CPC ..... H04W 4/028; H04W 16/26; H04W 60/00; H04B 7/15507; H04B 3/36
USPC ............................... 455/434, 435.1, 7, 9, 11.1
See application file for complete search history.

(56) References Cited

U.S. PATENT DOCUMENTS

| 8,180,322 | B2 * | 5/2012 | Nakae | ..................... H04L 45/30 370/329 |
| 2011/0312266 | A1 * | 12/2011 | Kono | ................... G06Q 10/087 455/7 |

FOREIGN PATENT DOCUMENTS

| JP | 2010-109505 | 5/2010 |
| JP | 2010-136350 | 6/2010 |

* cited by examiner

*Primary Examiner* — Khai M Nguyen
(74) *Attorney, Agent, or Firm* — Warner Norcross & Judd LLP

(57) ABSTRACT

A radio client device scans a channel allocated to a predetermined repeater, and transmits a request for location registration to the predetermined repeater in a case of detecting a usage condition signal. A repeater, in a case of receiving a request for location registration from a radio client device, conducts location registration for the radio client device, transmits information about the radio client device whose location is registered to a predetermined repeater in a communication area of the repeater or to a predetermined repeater in a different communication area, and in a case of receiving information about a radio client device whose location is registered from another repeater in the communication area of the repeater, transmits information about the radio client device whose location is registered to the predetermined repeater in the different communication area.

15 Claims, 8 Drawing Sheets

RADIO COMMUNICATION SYSTEM, LOCATION REGISTRATION METHOD, REPEATER, AND RADIO CLIENT DEVICE

CROSS-REFERENCE TO RELATED APPLICATION

This application claims the benefit of Japanese Patent Application No. 2013-126428, filed on Jun. 17, 2013, the entire disclosure of which is incorporated by reference herein.

FIELD

The present invention relates to a radio communication system, a location registration method, a repeater, and a radio client device.

BACKGROUND

Trunking radio communication systems (hereinafter designated "trunking systems") are known. A trunking system includes a plurality of repeaters in a single site (communication area), and a plurality of radio client devices share multiple talk channels with the plurality of repeaters. Among trunking systems, there are some called dedicated control type, which have a dedicated control channel, and some called distributed control type, which do not have a dedicated control channel.

In a dedicated control type trunking system, one control channel is provided for one site. A radio client device requests a repeater having the control channel for location registration, and that repeater conducts location registration for the radio client device. After that, the radio client device sets an idle channel based on control information transmitted via the control channel, and communicates with another radio client device via the idle channel.

A distributed control type trunking system includes, for one site, one repeater called a collect repeater that conducts location registration of a radio client device. A radio client device requests the collect repeater for location registration, and the collect repeater conducts location registration for the radio client device, and sets a home repeater. After that, the radio client device sets an idle channel based on control information from the home repeater, and communicates with another radio client device via the idle channel.

Unexamined Japanese Patent Application Publication No. 2010-109505 and Unexamined Japanese Patent Application Publication No. 2010-136350 disclose technology related to a distributed control type trunking system. With the radio communication system disclosed in Unexamined Japanese Patent Application Kokai Publication No. 2010-109505, in the case where a situation occurs in which operation stops at the home repeater, a secondary repeater acquires the home repeater's control information and conducts a repeater process as a proxy for the home repeater. In the radio communication system disclosed in Unexamined Japanese Patent Application Kokai Publication No. 2010-136350, in the case where a radio client device is able to receive a downlink signal from a home repeater but an uplink signal does not reach a repeater that provides an idle channel, the radio client device transmits a signal requesting communication with a peer radio client device on the same frequency as the frequency of the downlink signal from the home repeater.

With a dedicated control type trunking system, in one site, the repeater that has the control channel is unable to conduct location registration for another radio client device while conducting location registration for a given radio client device. Also, with a distributed control type trunking system that includes one collect repeater for one site, the collect repeater in one site is unable to conduct location registration for another radio client device while conducting location registration for a given radio client device. For this reason, in the case where a plurality of radio client devices request location registration at the same time in one site, it is necessary to successively conduct location registration for the plurality of radio client devices one at a time, and it takes time to complete location registration for the plurality of radio client devices.

SUMMARY

The present invention, being devised in light of circumstances like the above, takes as an object to shorten a time required by a location registration process for a radio client device in a distributed trunking system.

In order to achieve the above object, a radio communication system according to a first aspect of the present invention comprises:

a plurality of repeaters connected to each other via communication lines, each allocated with a unique channel; and a plurality of radio client devices that communicate with each other via at least one of the plurality of repeaters;

wherein a plurality of communication areas are formed in which each of the plurality of radio client devices is capable of receiving a signal transmitted by multiple repeaters from among the plurality of repeaters in each communication area, in each communication area, at least one predetermined repeater transmits a usage condition signal in a case where a channel allocated to the predetermined repeater is usable for communication, each of the plurality of radio client devices scans a channel allocated to the predetermined repeater, and transmits a request for location registration to the predetermined repeater in a case of detecting the usage condition signal, and the repeater, in a case of receiving a request for location registration from one of the plurality of radio client devices, conducts location registration for the radio client device, transmits information about the radio client device whose location is registered to a predetermined repeater in a communication area of the repeater or to a predetermined repeater in a different communication area, and in a case of receiving information about a radio client device whose location is registered from another repeater in the communication area of the repeater, transmits information about the radio client device whose location is registered to the predetermined repeater in the different communication area.

Preferably, the plurality of repeaters include a main repeater, being the predetermined repeater that transmits the usage condition signal, and a sub-repeater, being a repeater that does not transmit the usage condition signal, each of the plurality of radio client devices scans a channel allocated to the main repeater, and in a case of detecting the usage condition signal, transmits a request for location registration to the main repeater, and in a case where the main repeater is in an unusable state and there is another main repeater or the sub-repeater in a communication area of the main repeater, additionally scans a channel allocated to the other main repeater or the sub-repeater, and in a case of detecting another usable repeater thereby, transmits a request for location registration to the other usable repeater, the sub-repeater, in a case of receiving a request for location registration from one of the plurality of radio client devices, conducts location registration for the radio client device, and transmits information about the radio client device whose location is registered to a predetermined main repeater in a communication area of the sub-repeater, and the main repeater, in a case of receiving a request for location registration from one of the plurality of radio client devices, conducts location registration for the radio client device, transmits information about the radio client device whose location is registered to a predetermined main repeater in the communication area of the main repeater or to a predetermined repeater in a different communication area, and in a case of receiving the information about a radio client device whose location is registered from the other main repeater or the sub-repeater in the communication area of the main repeater, transmits information about the radio client device whose location is registered to the predetermined repeater in the different communication area.

Preferably, at least one of the plurality of communication areas includes a plurality of main repeaters that transmit and receive an information signal with each other, and the sub-repeater, and the main repeater, in a case of determining based on the information signal that a malfunction has occurred in a predetermined main repeater in a communication area of the main repeater, executes a process of the predetermined main repeater as a proxy.

Preferably, each of the plurality of radio client devices scans a channel allocated to the predetermined repeater in a last communication area where location registration occurred from among the plurality of communication areas, and in a case where a downlink signal strength of the predetermined repeater is at or above a threshold, and the usage condition signal is detected, transmits a request for location registration to the predetermined repeater, and in a case where the downlink signal strength is less than the threshold, scans a channel allocated to a predetermined repeater in another communication area.

Preferably, each of the plurality of radio client devices scans a channel allocated to the predetermined main repeater, and in a case of detecting the usage condition signal, transmits a request for location registration to the predetermined main repeater, and in a case where the predetermined main repeater is in an unusable state and there is another main repeater in a communication area of the predetermined main repeater, transmits the request for location registration to the other main repeater, whereas in a case where the predetermined main repeater is in an unusable state and there is not another main repeater in the communication area of the predetermined main repeater, transmits the request for location registration to a sub-repeater in the communication area of the predetermined main repeater.

Preferably, the predetermined repeater, in a case of receiving a request for location registration from one of the plurality of radio client devices, conducts location registration for the radio client device, and transmits information about the radio client device whose location is registered to another repeater in a communication area of the predetermined repeater and to a predetermined repeater in a different communication area.

Preferably, the predetermined repeater, in a case of receiving information about a radio client device whose location is registered from a predetermined repeater in a different communication area from the communication area of the predetermined repeater, transmits the information about a radio client device whose location is registered to another repeater in the communication area of the predetermined repeater.

A location registration method according to a second aspect of the present invention is a location registration method conducted by a radio communication system comprising a plurality of repeaters connected to each other via communication lines, each allocated with a unique channel, and a plurality of radio client devices that communicate with each other via at least one of the plurality of repeaters, wherein a plurality of communication areas are formed in which each of the plurality of radio client devices is capable of receiving a signal transmitted by multiple repeaters from among the plurality of repeaters in each communication area, and in each communication area, at least one predetermined repeater transmits a usage condition signal in a case where a channel allocated to the predetermined repeater is usable for communication, the location registration method comprising:

each of the plurality of radio client devices conducting a location registration requesting step of scanning a channel allocated to the predetermined repeater, and in a case of receiving, on the channel, the usage condition signal that matches a predetermined reference, transmitting a request for location registration to the predetermined repeater; and the repeater conducting a location registering step of, in a case of receiving a request for location registration from one of the plurality of radio client devices, conducting location registration for the radio client device, transmitting information about the radio client device whose location is registered to a predetermined repeater in a communication area of the repeater or to a predetermined repeater in a different communication area, and in a case of receiving information about a radio client device whose location is registered from another repeater in the communication area of the repeater, transmitting information about the radio client device whose location is registered to the predetermined repeater in the different communication area.

A repeater according to a third aspect of the present invention is a repeater, mutually connected to other repeaters via communication lines, and allocated with a unique channel, comprising a location register that, in a case of receiving a request for location registration from a radio client device, conducts location registration for the radio client device; and a transmitter that, in a case where the location registration of the radio client device is completed, transmits information about the radio client device whose location is registered to a predetermined other repeater in a communication area in which the radio client device is capable of receiving a signal transmitted by the repeater, or to a predetermined other repeater in a different communication area, and in a case of receiving information about a radio client device whose location is registered from another repeater in the communication area of the repeater, transmits information about the radio client device whose location is registered to the predetermined other repeater in the different communication area.

Preferably, the communication area includes a plurality of repeaters that transmit and receive an information signal with each other, and the repeater further comprises a proxy processor that, in a case of determining based on the information signal that a malfunction has occurred in another repeater in the communication area, executes a process of the other repeater as a proxy.

Preferably, in the case of receiving a request for location registration from the radio client device, the location register conducts location registration for the radio client device, and the transmitter transmits the information about the radio client device whose location is registered to another repeater in the communication area of the current repeater and to a predetermined repeater in a different communication area.

Preferably, in a case of receiving information about a radio client device whose location is registered from a predetermined repeater in a different communication area from the communication area of the current repeater, the transmitter transmits the information about a radio client device whose location is registered to another repeater in the communication area of the current repeater.

A radio client device according to a fourth aspect of the present invention is a radio client device that communicates with another radio client device via at least one of a plurality of repeaters that are connected to each other via communication lines and are each allocated with a unique channel, wherein a communication area is formed in which the radio client device is capable of receiving a signal transmitted by multiple repeaters from among the plurality of repeaters, and in a case where there exists, in the communication area, a main repeater, being a predetermined repeater that transmits a usage condition signal in a case where an allocated channel is usable for communication, and a sub-repeater, being a repeater that is not the main repeater, the radio client device comprising:

a scanner that scans a channel allocated to the main repeater; and a transmitter that, in a case of receiving the usage condition signal, transmits a request for location registration to the main repeater, wherein, in a case where the main repeater is in an unusable state and there is another main repeater or the sub-repeater in the communication area, the scanner additionally scans a channel allocated to the other main repeater or the sub-repeater, and in a case of detecting another usable repeater thereby, the transmitter transmits a request for location registration to the other usable repeater.

Preferably, a plurality of communication areas are formed in which the radio client device is capable of receiving a signal transmitted by multiple repeaters from among the plurality of repeaters in each communication area, and in a case where there exists, in each of the plurality of communication areas, a main repeater, being a predetermined repeater that transmits the usage condition signal, and a sub-repeater, being a repeater that is not the main repeater, the scanner scans a channel allocated to a main repeater in a last communication area where location registration occurred from among the plurality of communication areas, and in a case where a downlink signal strength of the main repeater is at or above a threshold, and the usage condition signal is detected, the transmitter transmits a request for location registration to the main repeater, and in a case where the downlink signal strength is less than the threshold, the scanner scans a channel allocated to a main repeater in another communication area.

Preferably, the scanner scans a channel allocated to the main repeater, and in a case of receiving the usage condition signal, the transmitter transmits a request for location registration to the main repeater, and in a case where the main repeater is in an unusable state and there is another main repeater in the communication area, the transmitter transmits the request for location registration to the other main repeater, whereas in a case where the main repeater is in an unusable state and there is not another main repeater in the communication area, the transmitter transmits the request for location registration to a sub-repeater in the communication area.

According to the present invention, it becomes possible to shorten a time required by a location registration process for a radio client device in a distributed trunking system.

BRIEF DESCRIPTION OF THE DRAWINGS

A more complete understanding of this application can be obtained when the following detailed description is considered in conjunction with the following drawings, in which.

DETAILED DESCRIPTION

Hereinafter, exemplary embodiments of the present invention will be described in detail and with reference to the drawings. Note that in the drawings, the same signs are given to the same or similar parts.

Embodiment 1

Figure 1:
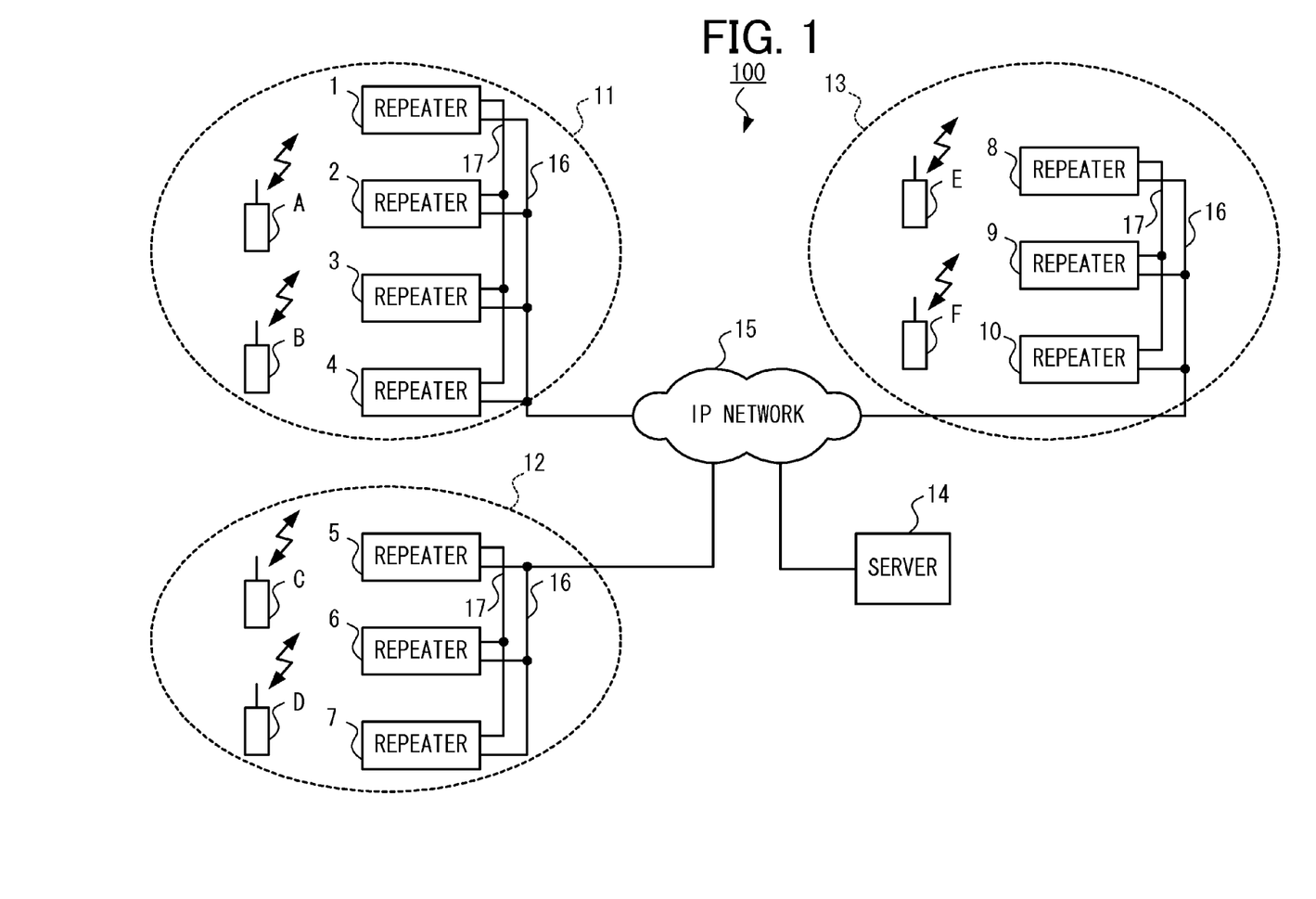
FIG. 1 is a block diagram illustrating an exemplary configuration of a radio communication system according to Embodiment 1 of the present invention.

FIG. 1 is a block diagram illustrating an exemplary configuration of a radio communication system according to Embodiment 1 of the present invention. The radio communication system 100 is a distributed trunking system, and is equipped with repeaters 1 to 10 and radio client devices A to F. A unique channel is respectively allocated to the repeaters 1 to 10. In each communication area of the radio communication system 100, there is formed a communication area (hereinafter designated a site) in which the respective radio client devices A to F are able to receive a signal transmitted by multiple repeaters from among the repeaters 1 to 10. In the example in FIG. 1, in the radio communication system 100, a site 11 includes the repeaters 1 to 4, a site 12 includes the repeaters 5 to 7, and a site 13 includes the repeaters 8 to 10. In the example in FIG. 1, the repeaters 1 to 4 installed within the same site are connected to each other via a system bus 17. Similarly, the repeaters 5 to 7 are connected to each other via a system bus 17, and the repeaters 8 to 10 are connected to each other via a system bus 17. Also, the repeaters 1 to 10 are connected to each other and connected to a server 14 via IP (Internet Protocol) connections or other such communication lines 16 as well as an IP network 15.

In the example in FIG. 1, the radio client devices A and B within the site 11 respectively communicate with one of the repeaters 1 to 4 of the site 11. The radio client devices C and D within the site 12 respectively communicate with one of the repeaters 5 to 7 of the site 12. The radio client devices E and F within the site 13 respectively communicate with one of the repeaters 8 to 10 of the site 13. The radio client devices A to F communicate with each other via at least one of the repeaters 1 to 10.

Figure 2:
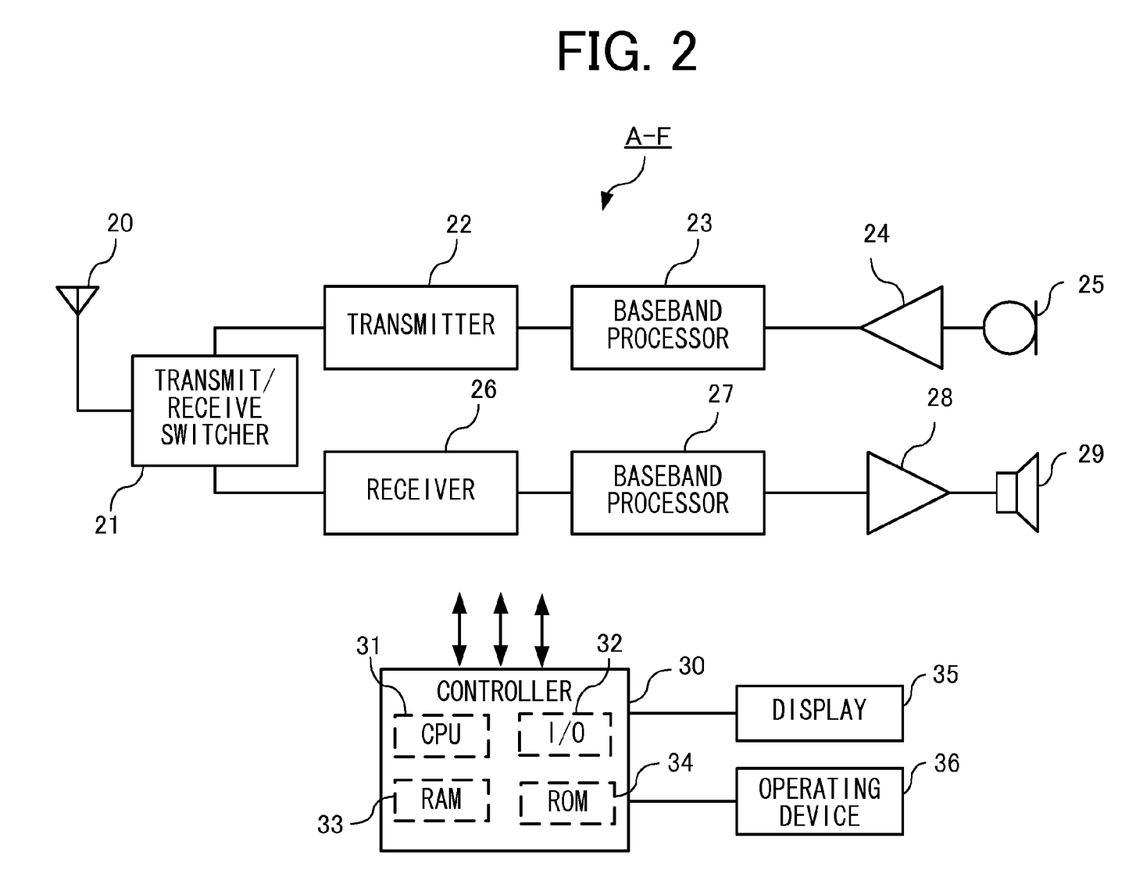
FIG. 2 is a block diagram illustrating an exemplary configuration of a radio client device according to Embodiment 1.

The radio client devices A to F are described below. FIG. 2 is a block diagram illustrating an exemplary configuration of a radio client device according to Embodiment 1. The radio client devices A to F all have a similar configuration, and are equipped with an antenna 20, a transmit/receive switcher 21, a transmitter 22, a baseband processor 23, an A-D (Analog-to-Digital) converter 24, a mic 25, a receiver 26, a baseband processor 27, a D-A (Digital-to-Analog) converter 28, a speaker 29, a controller 30, a display 35, and an operating device 36. The controller 30 is equipped with a CPU (Central Processing Unit) 31, RAM (Random Access Memory) 33, and ROM (Read-Only Memory) 34.

Signal lines from the controller 30 to each component are omitted to avoid complexity and ease comprehension, but the controller 30 is connected to each component of the radio client devices A to F via I/O (Input/Output) 32, and controls the starting, ending, and content of these processes. The CPU 31 controls the radio client devices A to F by executing a control program stored in the ROM 34. Also, the CPU 31 processes commands and data input from the operating device 36 as well as data obtained from the baseband processor 27, temporarily stores such data in the RAM 33, and displays stored commands and data as necessary on a display 35 comprising a LCD (Liquid Crystal Display) or the like.

In the case where a calling operation is performed by the operating device 36, the radio client devices A to F enter a transmission mode, whereas the radio client devices A to F are in a reception mode while a calling operation is not performed. In the case where the radio client devices A to F are in transmission mode, the mic 25 outputs an analog voice signal corresponding to voice input to the A-D converter 24. The A-D converter 24 converts the voice signal from the mic 25 from analog to digital, and outputs to the baseband processor 23. The baseband processor 23, based on voice signal data from the A-D converter 24 or data stored in the RAM 33 of the controller 30, generates a communication format in a predetermined format, and outputs to the transmitter 22. The transmitter 22 modulates the communication frame generated by the baseband processor 23, and transmits to the repeaters 1 to 10 via the transmit/receive switcher 21 and the antenna 20. The modulation scheme used by the transmitter 22 may be GMSK (Gaussian filtered Minimum-Shift Keying), PSK (Phase-Shift Keying), QAM (Quadrature Amplitude Modulation), FSK (Frequency-Shift Keying), or the like, for example.

In the case where the radio client devices A to F are in reception mode, if a radio signal is transmitted from the repeaters 1 to 10, the receiver 26 receives the radio signal transmitted from the repeaters 1 to 10 via the antenna 20 and the transmit/receive switcher 21. The receiver 26 amplifies the received signal while also performing signal processing such as a demodulation process to generate a demodulated signal, and outputs the demodulated signal to the baseband processor 27. The baseband processor 27 extracts a communication frame from the demodulated signal, and outputs information in the header part of the communication frame to the CPU 31. The CPU 31 analyzes the header part information. If, as a result of analyzing the header part information, it is determined that the destination is the current device, the CPU 31 causes the baseband processor 27 to output the voice signal data included in the data part of the communication frame to the D-A converter 28, causes the RAM 33 to temporarily store non-voice signal data included in the data part of the communication frame, and causes the display 35 to display stored data as necessary. The D-A converter 28 converts the voice signal data from digital to analog, and outputs to the speaker 29. The speaker 29 outputs the data converted to analog.

The repeaters 1 to 10 are described below. Upon receiving a radio signal from a source radio client device A to F, the repeaters 1 to 10 conduct signal processing such as amplification processing and waveform processing on the received radio signal, and transmit the processed data to a destination radio client device A to F. The repeaters 1 to 10 each comprises a repeater unit and a trunking controller. The respective trunking controllers connected to the respective repeater units are connected by a system bus 17, and transmit various information to each other, such as IDs (Identifying Codes) needed for control of trunking. The repeaters 1 to 10 and the server 14 are connected via the communication lines 16 and the IP network 15, and the server 14 is able to configure various settings of the trunking controllers by remote operation. The repeaters 1 to 10 deliver individual information on the system bus 17. A time slot in which to deliver information is predetermined for each of the repeaters 1 to 10. Each of the repeaters 1 to 10 delivers information in a predetermined time slot, and acquire information on other repeaters delivered in time slots other than that time slot.

Figure 3:
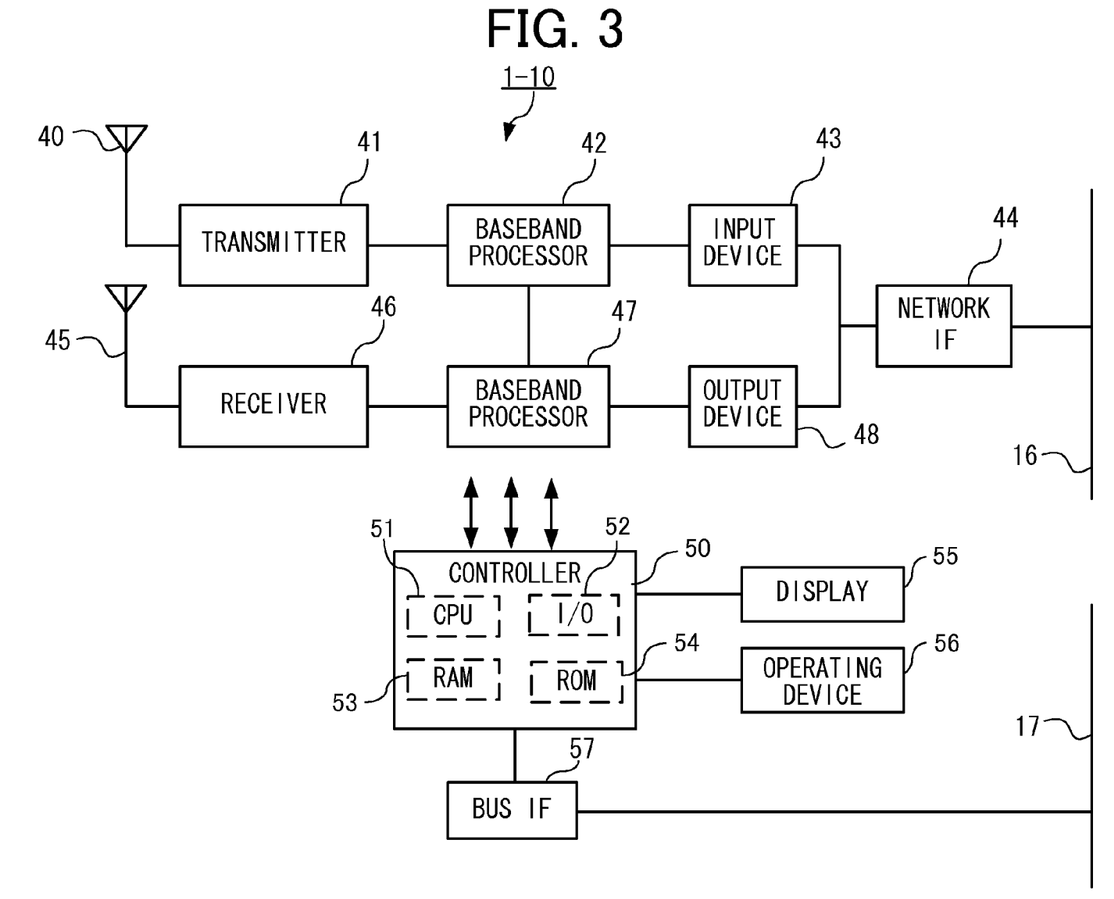
FIG. 3 is a block diagram illustrating an exemplary configuration of a repeater according to Embodiment 1.

FIG. 3 is a block diagram illustrating an exemplary configuration of a repeater according to Embodiment 1. The repeaters 1 to 10 all have a similar configuration, and are equipped with a transmission antenna 40, a transmitter 41, a baseband processor 42, an input device 43, a network IF (InterFace) 44, a reception antenna 45, a receiver 46, a baseband processor 47, an output device 48, a controller 50, a display 55, an operating device 56, and a bus IF 57. The configuration of the controller 50 is similar to the controller 30 provided in the radio client devices A to F illustrated in FIG. 2. The controller 50 is connected to each component of the repeaters 1 to 10 via I/O 52, and controls the starting, ending, and content of these processes.

The receiver 46 receives a radio signal from the radio client devices A to F via the reception antenna 45. The receiver 46 amplifies the received signal while also performing signal processing such as a demodulation process to generate a demodulated signal, and outputs the demodulated signal to the baseband processor 47. The baseband processor 47 extracts a communication frame from the demodulated signal, and outputs information in the header part of the communication frame to the CPU 51. The CPU 51 analyzes the header part information. If, as a result of analysis, it is determined that the destination radio client device A to F exists in the site of the current device, the CPU 51 causes the baseband processor 47 to output a communication frame to the baseband processor 42. The baseband processor 42 performs necessary processing and outputs a communication frame to the transmitter 41. The transmitter 41 modulates the communication frame and transmits from the transmission antenna 40 to a destination radio client device A to F. The modulation scheme used by the transmitter 41 is GMSK, PSK, QAM, FSK, or the like. On the other hand, if it is determined that the destination radio client device A to F exists in a different site from the site of the current device, the CPU 51 causes the baseband processor 47 to output a communication frame to the output device 48. The output device 48 outputs the communication frame to a communication line 16 via the network IF 44.

The input device 43 receives a communication frame transmitted by another repeater from a communication line 16 via the network IF 44, and outputs to the baseband processor 42. The baseband processor 42 extracts outputs information in the header part of the communication frame to the CPU 51. The CPU 51 analyzes the header part information. If, as a result of analysis, it is determined that the destination radio client device A to F exists in the site of the current device, the CPU 51 causes the baseband processor 42 to output a communication frame to the transmitter 41. The transmitter 41 modulates the communication frame and transmits from the transmission antenna 40 to a destination radio client device A to F.

Also, the input device 43 receives, from a communication line 16 via the network IF 44, control data transmitted by the server 14, and outputs to the CPU 51. Based on the control data, the CPU 51 causes the output device 48 to output data requested from the server 14 and the like to a communication line 16 via the network IF 44.

The controller 50 is connected to the system bus 17 via the bus IF 57. The controller 50 controls the repeaters 1 to 10 based on a synchronization signal delivered on the system bus 17 and data delivered by other repeaters.

In the case where the radio client devices A to F communicate via the repeaters 1 to 10, the uplink, which is communication from the radio client devices A to F to the repeaters 1 to 10, and the downlink, which is communication from the repeaters 1 to 10 to the radio client devices A to F, are simultaneously conducted using different frequencies or time slots. For this reason, the repeaters 1 to 10 are equipped with the transmission antenna 40 and the reception antenna 45.

In Embodiment 1, one main repeater is provided in each site. For example, the repeaters 1, 5, and 8 are respectively set as main repeaters, while the repeaters 2 to 4, 6, 7, 9, and 10 are respectively set as sub-repeaters (repeaters that are not main repeaters). A main repeater is a predetermined repeater that transmits a usage condition signal in the case where the channel allocated to the current device is usable for communication. In the case where the channel allocated to the current device is usable for communication, a main repeater transmits a downlink signal that includes an idle message at a predetermined interval. The interval by which to transmit a downlink signal that includes an idle message may be arbitrarily set. In Embodiment 1, the sub-repeaters do not transmit a downlink signal that includes an idle message like the main repeaters. Also, a master repeater that delivers a synchronization signal for synchronizing repeaters is provided in each site. In Embodiment 1, the main repeater delivers a synchronization signal on the system bus 17 as the master repeater. Each sub-repeater acquires the synchronization signal delivered on the system bus 17, and synchronizes.

The radio client devices A to F make a location registration request to one of the repeaters 1 to 10 in the case where the power turns from an off state to an on state, or in the case of returning to the service area of the sites 11 to 13 from outside the service area, for example. The radio client devices A to F hold information on the repeaters 1 to 10 constituting each of the sites 11 to 13 as well as the channels allocated to the repeaters 1 to 10. Location registration request operations are described below in detail, taking the radio client device A as an example.

The radio client device A scans the channel of the main repeater in one of the sites 11 to 13, such as the repeater 1, for example, and determines whether or not a signal received on that channel matches a predetermined reference. The controller 30 operates as a scanner that scans a channel allocated to the main repeater. The radio client device A determines whether or not the downlink signal strength is at or above a threshold, for example. In the case where the downlink signal strength is less than the threshold, the radio client device A successively scans the channels of the main repeaters in other sites. The threshold may be arbitrarily defined with consideration for the performance of the radio client devices A to F, repeaters 1 to 10, and the like. In the case where the downlink signal strength is at or above the threshold, the radio client device A determines whether or not the repeater 1 is usable, based on a downlink signal received from the main repeater in the site 11 (that is, the repeater 1). In the case of detecting an idle message from the repeater 1, the radio client device A determines that the repeater 1 is usable, and transmits a request for location registration to the repeater 1.

In the case of not detecting an idle message, the radio client device A determines that the repeater 1 is not usable, and successively scans the channels of the sub-repeaters in the site 11 to which the repeater 1 belongs. In the case of detecting a sub-repeater that is usable, a location registration request is transmitted to that sub-repeater. For example, in the case where the repeater 1 is not usable, the radio client device A scans the channel of the repeater 2. In the case where the repeater 2 is usable, the radio client device A transmits a request for location registration to the repeater 2. In the case where the strength of a signal received on the channel of the repeater 2 is at or below a threshold, the radio client device A determines that the repeater 2 is usable. The threshold may be arbitrarily defined with consideration for the performance of the radio client devices A to F, repeaters 1 to 10, and the like. In the case where the repeater 2 is not usable, the radio client device A successively scans the channels of the repeaters 3 and 4, which are sub-repeaters in the site 11.

In the case where the main repeater (that is, the repeater 1) and the sub-repeaters (that is, the repeaters 2 to 4) are all unusable, the radio client device A successively scans the channels of the main repeaters in other sites, and repeats the process discussed above. The radio client device A scans the channel of the repeater 5 and determines whether or not the downlink signal strength is at or above a threshold, for example. The process after that is similar to the example discussed above. Also, in the case where the sub-repeaters (that is, the sub-repeaters 2 to 4) are all unusable, the radio client device A may also repeatedly scan the channels of the sub-repeaters (that is, the repeaters 2 to 4) again.

The order in which to scan the channels of the main repeater in each site and the order in which to scan the channels of the main repeater and the sub-repeaters in the same site may be arbitrarily set. The radio client devices A to F may also start scanning from the channel of the main repeater in the last site where location registration occurred from among the sites 11 to 13, for example. By scanning from the channel of the main repeater in the last site where location registration occurred, it becomes possible to shorten the time until a usable repeater from among repeaters 1 to 10 is found.

A repeater 1 to 10 that has received a request for location registration from one of the radio client devices A to F conducts location registration for the radio client device from which the request was received. The controller 50 operates as a location register that conducts location registration for the radio client device which the request was received. Location registration operations are described below in detail, taking the repeaters 1 and 2 of the site 11 as an example.

In the case where the repeater 1, which is the main repeater in the site 11, receives a request for location registration from the radio client device A, the repeater 1 conducts location registration for the radio client device A, and sets a home repeater for the radio client device A. An arbitrary repeater from among the repeaters 1 to 4 in the site 11 may be set as the home repeater. Once location registration for the radio client device A and the setting of a home repeater is completed, the repeater 1 notifies the radio client device A. The radio client device A whose location is registered becomes able to communicate with the other radio client devices B to F by receiving information on idle channels from the home repeater.

The repeater 1 transmits information about the radio client device A whose location is registered to the respective main repeaters of the sites 12 and 13 (that is, the repeaters 5 and 8). Also, the repeater 1 transmits information about the radio client device A whose location is registered to the sub-repeaters in the site 11 (that is, the repeaters 2 to 4). Upon receiving information about the radio client device A whose location is registered, the respective main repeaters of the sites 12 and 13 (that is, the repeaters 5 and 8) transmit information about the radio client device A whose location is registered to the respective sub-repeaters in the sites 12 and 13 (that is, the repeaters 6, 7, 9, and 10).

Also, in the case where the repeater 2, which is a sub-repeater in the site 11, receives a request for location registration from the radio client device A, the repeater 2 conducts location registration for the radio client device A, and sets a home repeater for the radio client device A. The repeater 2 transmits information about the radio client device A whose location is registered to the main repeater in the same site (that is, the repeater 1). Once location registration for the radio client device A and the setting of a home repeater is completed, the repeater 2 notifies the radio client device A.

In the case of receiving information about the radio client device A whose location is registered from the repeater 2, the repeater 1 transmits that information about the radio client device A whose location is registered to the respective main repeaters of the sites 12 and 13 (that is, the repeaters 5 and 8). Also, the repeater 1 transmits the information about the radio client device A whose location is registered to the sub-repeaters in the site 11 (that is, the repeaters 2 to 4). Upon receiving the information about the radio client device A whose location is registered, the respective main repeaters of the sites 12 and 13 (that is, the repeaters 5 and 8) transmit the information about the radio client device A whose location is registered to the respective sub-repeaters in the sites 12 and 13 (that is, the repeaters 6, 7, 9, and 10). Note that the repeater 2 may also transmit information about the radio client device A whose location is registered to sub-repeaters in the same site (that is, the repeaters 3 and 4).

By sharing information about the radio client device A whose location is registered among the respective main repeaters of the sites 11 to 13 (that is, the repeaters 1, 5, and 8), it becomes possible for radio client devices A to F whose locations are registered in different sites to communicate with each other.

Based on a downlink signal received from the main repeater or the home repeater at a predetermined timing, the radio client device A determines whether or not the device itself is within range of the site 11 where location registration was conducted, and makes a new location registration request as discussed earlier if out of range. The timing at which to determine whether or not the device is within range may be arbitrarily set.

By conducting location registration of the radio client devices A to F in not only the main repeaters but also the sub-repeaters, in the case where a plurality of radio client devices A to F in each site transmit requests for location registration at the same timings, it becomes possible to conduct location registration for each of the plurality of radio client devices A to F at the same timing, making it possible to shorten the time required for location registration.

Figure 4:
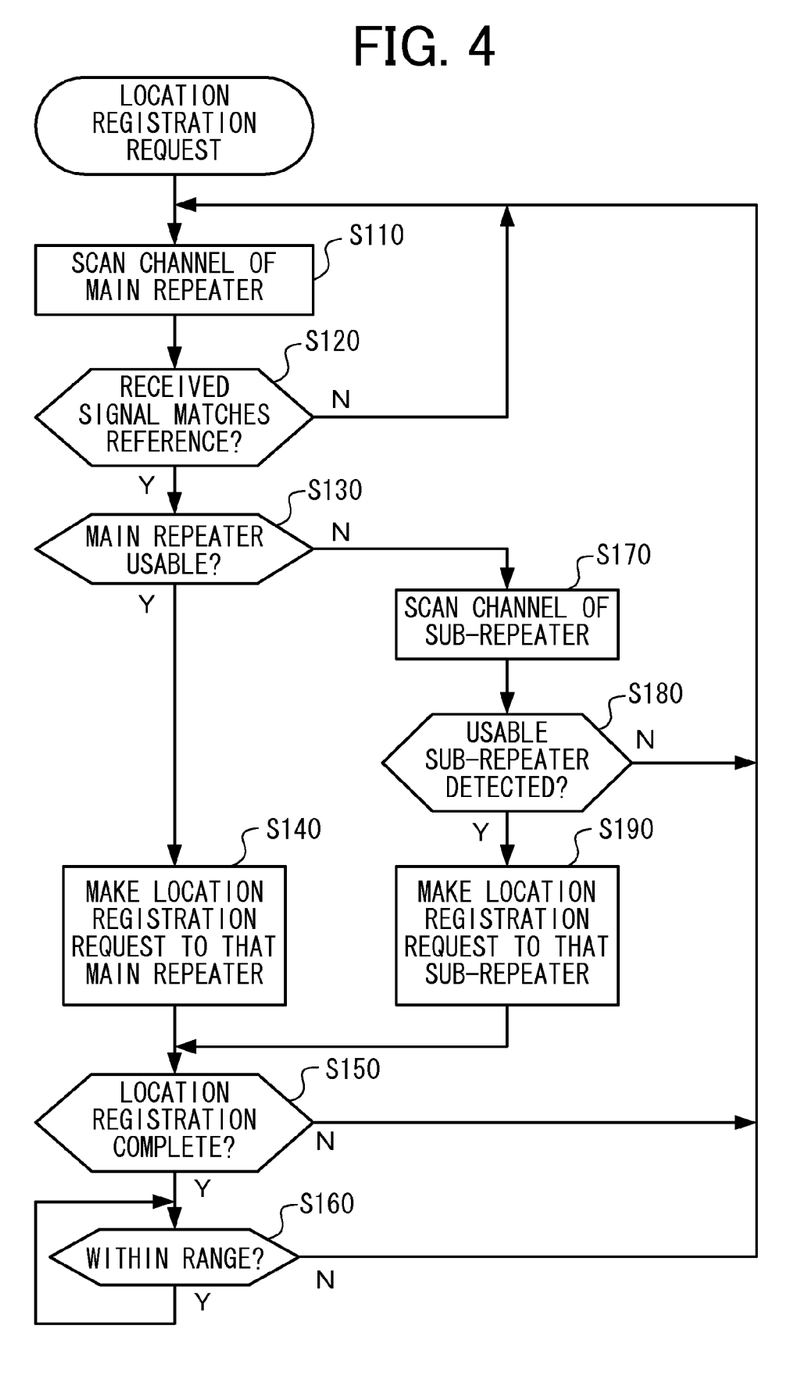
FIG. 4 is a flowchart illustrating an example of location registration request operations conducted by a radio client device according to Embodiment 1.

FIG. 4 is a flowchart illustrating an example of location registration request operations conducted by a radio client device according to Embodiment 1. The following description takes the radio client device A as an example. The radio client device A scans the channel of the main repeater in one of the sites 11 to 13, such as the repeater 1, for example (step S110). Based on the downlink signal strength, the radio client device A determines whether or not the signal received on that channel matches a predetermined reference (step S120). In the case where the downlink signal strength is less than the threshold, the radio client device A determines that the signal received on the channel does not match the predetermined reference (step S120; N), returns to step S110, and successively scans the channels of the main repeaters in other sites.

In the case where the downlink signal strength is at or above the threshold, the radio client device A determines that the signal received on the channel matches the predetermined reference (step S120; Y), and determines whether or not the repeater 1 is usable, based on a downlink signal received from the main repeater in the site 11 (that is, the repeater 1) (step S130). In the case of detecting an idle message, the radio client device A determines that the repeater 1 is usable (step S130; Y), transmits a request for location registration to the repeater 1 (step S140), and proceeds to step S150.

In the case of not detecting an idle message, the radio client device A determines that the repeater 1 is not usable (step S130; N), and successively scans the channels of the sub-repeaters in the site 11 (step S170). In the case of detecting a sub-repeater that is usable (step S180; Y), the radio client device A transmits a request for location registration to that sub-repeater (step S190), and proceeds to step S150. In the case of not detecting a sub-repeater that is usable (step S180; N), the radio client device A returns to step S110 and successively scans the channels of the main repeaters in other sites.

After receiving a notification from a main repeater or a sub-repeater indicating that location registration is complete (step S150; Y), the radio client device A determines whether or not the device itself is within range of the site 11, based on a downlink signal received from a main repeater or a home repeater (step S160). The processing in step S160 is repeated while it is determined that the radio client device A is within range of the site 11 (step S160; Y). In the case of determining that the radio client device A is not within range of the site 11 (step S160; N), the radio client device A returns to step S110 and conducts the process for requesting location registration discussed above.

In the case of not receiving a notification from a main repeater or a sub-repeater indicating that location registration is complete, even after a fixed amount of time elapses (step S150; N), the radio client device A returns to step S110 and successively scans the channels of the main repeaters in other sites.

Figure 5:
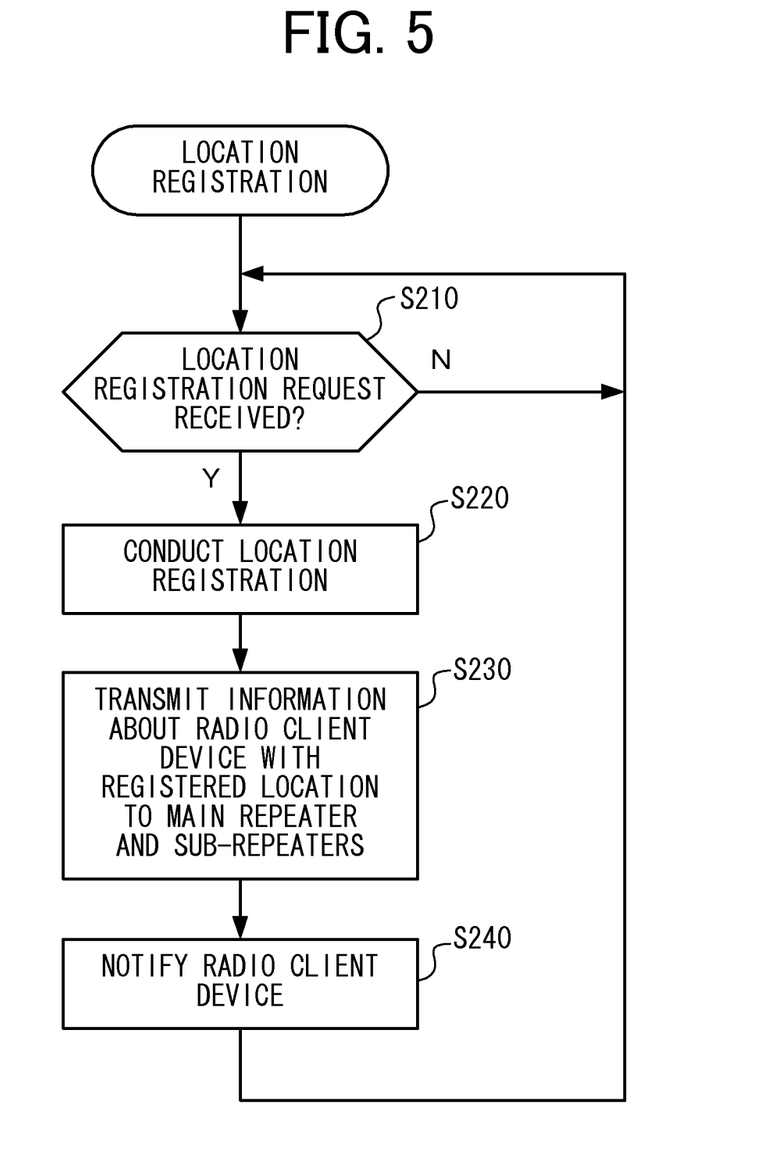
FIG. 5 is a flowchart illustrating an example of location registration operations conducted by a repeater according to Embodiment 1.

FIG. 5 is a flowchart illustrating an example of location registration operations conducted by a repeater according to Embodiment 1. The description below takes the main repeater in the site 11 (that is, the repeater 1) as an example. The repeater 1, which is a main repeater, stands by to receive a request for location registration from one of the radio client devices A to F (step S210; N), and repeats the processing in step S210. In the case of receiving a request for location registration from the radio client device A, for example (step S210; Y), the repeater 1 conducts location registration for the radio client device A (step S220). The repeater 1 transmits information about the radio client device A whose location is registered to the respective main repeaters (that is, the repeaters 5 and 8) of the other sites (sites 12 and 13) as well as to the sub-repeaters (that is, the repeaters 2 to 4) in the same site (site 11) (step S230). Once location registration for the radio client device A is completed, the repeater 1 notifies the radio client device A (step S240). After ending the processing in step S240, the repeater 1 returns the process to step S210, and repeats the process discussed above.

Location registration operations conducted by a sub-repeater in the site 11 (that is, the repeater 2) are similar to the location registration operations conducted by the repeater 1 illustrated in FIG. 5. However, in step S230, the sub-repeater (that is, the repeater 2) transmits information about the radio client device A whose location is registered to the main repeater (that is, the repeater 1) in the same site (site 11).

Figure 6:
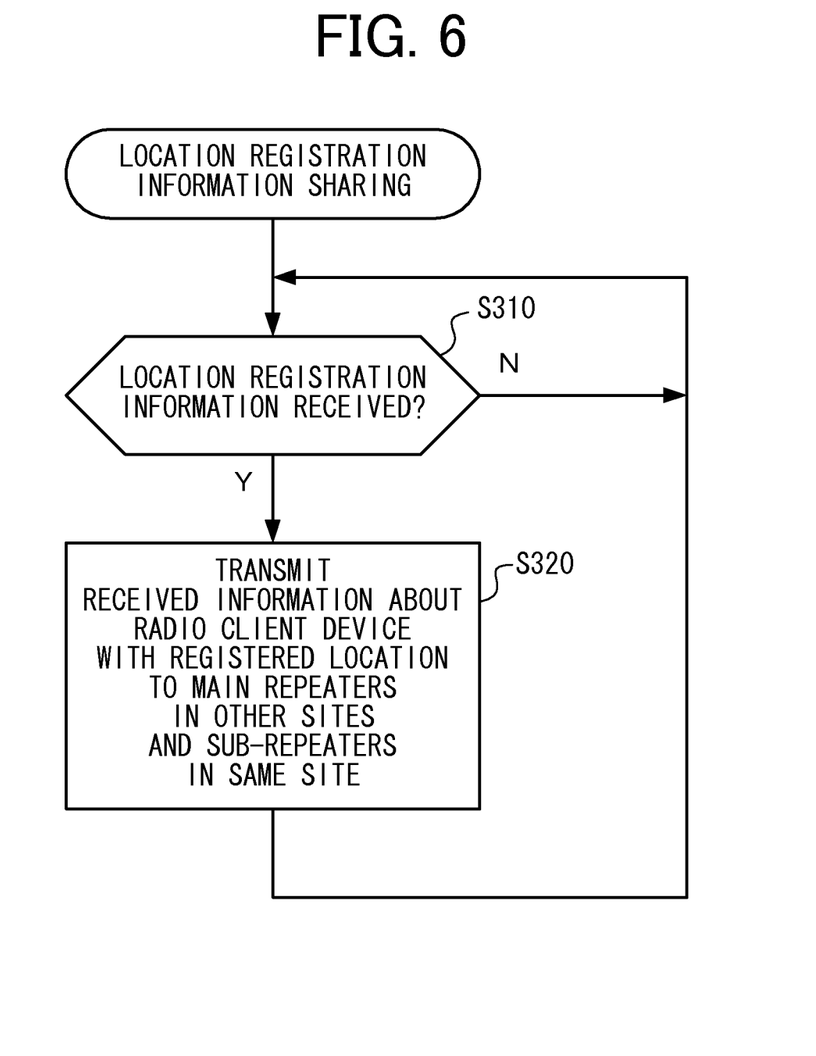
FIG. 6 is a flowchart illustrating an example of location registration information sharing operations conducted by a repeater according to Embodiment 1.

FIG. 6 is a flowchart illustrating an example of location registration information sharing operations conducted by a repeater according to Embodiment 1. The description below takes the main repeater in the site 11 (that is, the repeater 1) as an example. The repeater 1, which is a main repeater, stands by to receive information about a radio client device A to F whose location is registered from one of the sub-repeaters (that is, the repeaters 2 to 4) (step S310; N), and repeats the processing in step S310. In the case of receiving information about the radio client device A whose location is registered from the repeater 2, for example (step S310; Y), the repeater 1 transmits the received information about the radio client device A whose location is registered to the respective main repeaters in sites 12 and 13 (that is, the repeaters 5 and 8) as well as to the sub-repeaters in site 11 (that is, the repeaters 2 to 4) (step S320). After ending the processing in step S320, the repeater 1 returns the process to step S310, and repeats the process discussed above.

As described above, in the radio communication system 100, location registration of the radio client devices A to F is possible not only in the main repeaters, but also in the sub-repeaters. Consequently, according to a radio communication system 100 in accordance with Embodiment 1, it becomes possible to shorten the time required by a location registration process for the radio client devices A to F.

Embodiment 2

The configuration of a radio communication system 100 according to Embodiment 2 is the same as the configuration of a radio communication system 100 according to Embodiment 1. In Embodiment 2, a plurality of main repeaters are provided in at least one site. For example, the repeaters 1, 2, 5, and 8 are respectively set as main repeaters, while the repeaters 3, 4, 6, 7, 9, and 10 are respectively set as sub-repeaters. In other words, the site 11 includes two main repeaters. In Embodiment 2, the master repeater of the site 11 is set to the repeater 1.

The radio client devices A to F make a location registration request to the repeaters 1 to 10 in the case where the power turns from an off state to an on state, or in the case of returning to the service area of the sites 11 to 13 from outside the service area, for example. Location registration request operations are described below in detail, taking the radio client device A as an example.

The radio client device A scans the channel of a main repeater for one of the sites 11 to 13, such as the repeater 1, for example, and determines whether or not the downlink signal strength is at or above a threshold. For a site with a plurality of main repeaters like the site 11, the radio client device A scans the channel of a predetermined main repeater. The predetermined main repeater may be arbitrarily determined from among the plurality of main repeaters constituting the same site. In the case where the downlink signal strength is less than the threshold, the radio client device A successively scans the channels of the main repeaters for other sites. The threshold may be arbitrarily defined with consideration for the performance of the radio client devices A to F, repeaters 1 to 10, and the like. In the case where the downlink signal strength is at or above the threshold, the radio client device A determines whether or not the predetermined main repeater of the site 11, such as the repeater 1, for example, is usable, based on a downlink signal received from the repeater 1. In the case of detecting an idle message, the radio client device A determines that the repeater 1 is usable, and transmits a request for location registration to the repeater 1.

In the case of not detecting an idle message, the radio client device A determines that the repeater 1 is not usable, successively scans the channels of other main repeaters in the site 11, and determines whether or not another main repeater is usable, based on a downlink signal received from another main repeater. In the case where the predetermined main repeater (that is, the repeater 1) is not usable, the radio client device A scans the channel of the other main repeater (that is, the repeater 2), for example, and determines whether or not the repeater 2 is usable, based on a downlink signal received from the repeater 2. In the case of detecting an idle message, the radio client device A determines that the repeater 2 is usable, and transmits a request for location registration to the repeater 2.

In the case of not detecting an idle message, the radio client device A determines that the repeater 2 is not usable, scans the channels of the sub-repeaters in the site 11, and detects a sub-repeater that is usable. The radio client device A successively scans the channels of the repeaters 3 and 4, which are sub-repeaters in the site 11.

A repeater 1 to 10 that has received a request for location registration from one of the radio client devices A to F conducts location registration for the radio client device from which the request was received. Location registration operations are described below in detail, taking the repeaters 1 to 3 of the site 11 as an example.

In the case where the repeater 1, which is the predetermined main repeater for the site 11, receives a request for location registration from the radio client device A, the repeater 1 conducts location registration for the radio client device A, and sets a home repeater for the radio client device A. An arbitrary repeater from among the repeaters 1 to 4 in the site 11 may be set as the home repeater. Once location registration for the radio client device A and the setting of a home repeater is completed, the repeater 1 notifies the radio client device A. The radio client device A whose location is registered becomes able to communicate with the other radio client devices B to F by receiving information on idle channels from the home repeater.

The repeater 1 transmits information about the radio client device A whose location is registered to the respective main repeaters of the sites 12 and 13 (that is, the repeaters 5 and 8). Also, the repeater 1 transmits information about the radio client device A whose location is registered to the main repeater in the site 11 (that is, the repeater 2) as well as the sub-repeaters in the site 11 (that is, the repeaters 3 and 4). Upon receiving information about the radio client device A whose location is registered, the respective main repeaters of the sites 12 and 13 (that is, the repeaters 5 and 8) transmit information about the radio client device A whose location is registered to the respective sub-repeaters in the sites 12 and 13 (that is, the repeaters 6, 7, 9, and 10).

In the case where the repeater 2, which is a main repeater for the site 11, receives a request for location registration from the radio client device A, the repeater 1 conducts location registration for the radio client device A, and sets a home repeater for the radio client device A. The repeater 2 transmits information about the radio client device A whose location is registered to the predetermined main repeater in the same site (that is, the repeater 1). Once location registration for the radio client device A and the setting of a home repeater is completed, the repeater 2 notifies the radio client device A.

In the case where the repeater 3, which is a sub-repeater for the site 11, receives a request for location registration from the radio client device A, the repeater 3 conducts location registration for the radio client device A, and sets a home repeater for the radio client device A. The repeater 3 transmits information about the radio client device A whose location is registered to the predetermined main repeater in the same site (that is, the repeater 1). Once location registration for the radio client device A and the setting of a home repeater is completed, the repeater 3 notifies the radio client device A.

In the case of receiving information about the radio client device A whose location is registered from the repeater 2 or the repeater 3 in the same site (site 11), the predetermined main repeater (that is, the repeater 1) transmits that information about the radio client device A whose location is registered to the respective main repeaters in other sites (sites 12 and 13). Also, the repeater 1 transmits the information about the radio client device A whose location is registered to the sub-repeaters (that is, the repeaters 3 and 4) in the same site (site 11). Upon receiving the information about the radio client device A whose location is registered, the respective main repeaters of the sites 12 and 13 (that is, the repeaters 5 and 8) transmit the information about the radio client device A whose location is registered to the respective sub-repeaters in the sites 12 and 13 (that is, the repeaters 6, 7, 9, and 10). Note that the repeater 2 may also transmit information about the radio client device A whose location is registered to sub-repeaters in the same site (that is, the repeaters 3 and 4), and the repeater 3 may also transmit information about the radio client device A whose location is registered to a sub-repeater in the same site (that is, the repeater 4).

By sharing information about the radio client device A whose location is registered among the respective main repeaters of the sites 11 to 13 (that is, the repeaters 1, 2, 5, and 8), it becomes possible for radio client devices A to F whose locations are registered in different sites to communicate with each other.

Based on a downlink signal received from the predetermined main repeater or the home repeater at a predetermined timing, the radio client device A determines whether or not the device itself is within range of the site 11, and makes a new location registration request as discussed earlier if out of range.

By conducting location registration of the radio client devices A to F in not only the main repeaters but also the sub-repeaters, in the case where a plurality of radio client devices in each site transmit requests for location registration at the same timings, it becomes possible to conduct location registration for each of the plurality of radio client devices at the same timing, making it possible to shorten the time required for location registration.

A plurality of main repeaters constituting the same site transmit and receive information signals with each other. In the case where a malfunction occurs in the predetermined main repeater, another main repeater executes the processing of the predetermined main repeater as a proxy. The controller 50 operates as a proxy processor that executes a process of another repeater as a proxy. Proxy processing operations will be described, taking the repeaters 1 and 2 as an example.

The repeater 2, which is a main repeater of the site 11, executes the processing of the repeater 1 as a proxy in the case of determining, based on an information signal, that a malfunction has occurred in the predetermined main repeater of the site 11 (that is, the repeater 1). The repeater 2 determines that a malfunction has occurred in the repeater 1 in the case where a time during which an information signal is not received from the repeater 1 is at or above a threshold, for example. In the case of determining that a malfunction has occurred in the repeater 1, the repeater 2 sets the repeater 2 as the master repeater of the site 11. In addition, the repeater 2 sets the repeater 2 as the home repeater for radio client devices A to F having the repeater 1 set as the home repeater. The repeater 2 notifies the main repeaters of the sites 12 and 13 (that is, the repeaters 5 and 8), the sub-repeaters of the site 11 (that is, the repeaters 3 and 4), as well as a radio client device whose location is registered in the site 11, such as the radio client device A, for example, that a malfunction has occurred in the repeater 1.

After receiving the notification, a sub-repeater transmits information about a radio client device A to F whose location is registered to the repeater 2 rather than the repeater 1. In the case of receiving information about a radio client device A to F whose location is registered from a sub-repeater, the repeater 2 respectively transmits the information to the main repeaters of the sites 12 and 13 (that is, the repeaters 5 and 8). Also, a sub-repeater may also receive an information signal from a predetermined main repeater, and determine that a malfunction has occurred in the predetermined main repeater in the case where a time during which an information signal is not received is at or above a threshold. For example, in the case where a time during which an information signal is not received from the repeater 1 is at or above a threshold, the repeater 3 may transmit information about a radio client device A to F whose location is registered to the repeater 2 rather than the repeater 1.

In the case where the repeater 1 had been set as the home repeater for the radio client device A in the site 11, after receiving the notification, the radio client device A operates by treating the repeater 2 as the home repeater, and communicates with the other radio client devices B to F by receiving information on idle channels from the repeater 2. Also, in the case where a time during which a downlink signal from the home repeater (that is, the repeater 1) is not received is at or above a threshold, the radio client device A may determine that a malfunction has occurred in the repeater 1, scan the channel of the repeater 2, and receive information on idle channels from the repeater 2.

In the case where a plurality of main repeaters exist in a site, and a malfunction occurs in a predetermined main repeater, another main repeater executes the processing of the malfunctioning main repeater as a proxy. Thus, it becomes possible to continue the location registration of the radio client devices A to F, the sharing of location registration information, repeater processing, and the like, even in the case where a malfunction occurs in a predetermined main repeater. Although the above example discusses the case where there are two main repeaters, the number of main repeaters is an arbitrary value equal to or greater than 2. For example, it is also possible to set the repeaters 1 to 3 as main repeaters. In the case where a malfunction occurs in the repeater 1, the repeater 2 executes the processing of the repeater 1 as a proxy, and in the further case where a malfunction also occurs in the repeater 2, the repeater 3 executes the processing of the repeater 1 as a proxy.

Figure 7:
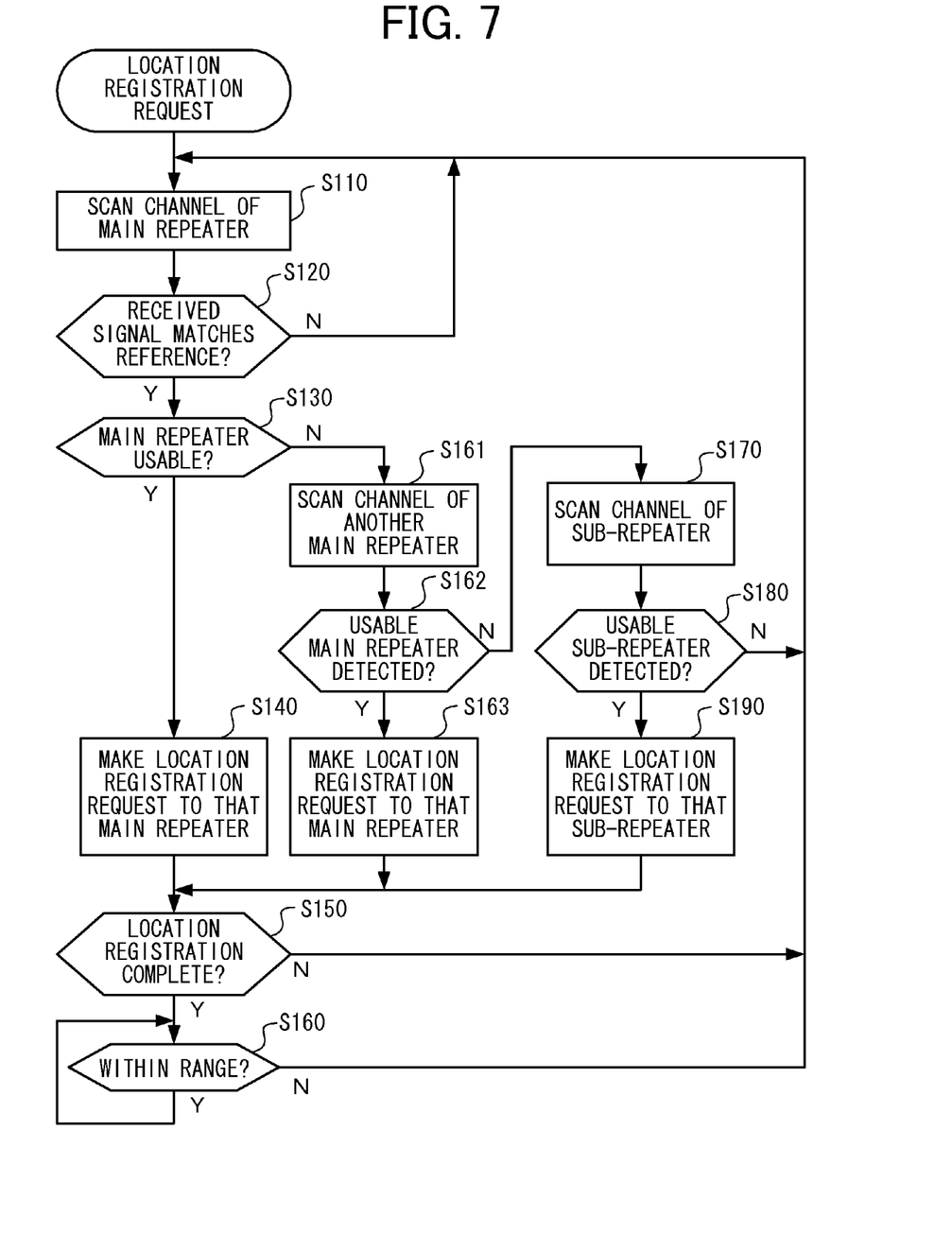
FIG. 7 is a flowchart illustrating an example of location registration request operations conducted by a radio client device according to Embodiment 2 of the present invention.

FIG. 7 is a flowchart illustrating an example of location registration request operations conducted by a radio client device according to Embodiment 2 of the present invention. The following description takes the radio client device A as an example. The processing from steps S110 to S160, and from steps S170 to S190, is similar to the operations of radio client device according to Embodiment 1 illustrated in FIG. 4. In the case where a plurality of main repeaters exist in one site, the determination process in step S120 may be conducted for each main repeater. In the case of not detecting an idle message, the radio client device A determines that the repeater 1 is not usable (step S130; N), and scans the channel of another main repeater in the site 11 (step S161). In the case of detecting a main repeater that is usable (step S162; Y), the radio client device A transmits a request for location registration to that main repeater (step S163), and proceeds to step S150. In the case of not detecting a main repeater that is usable (step S162; N), the process proceeds to step S170.

Location registration operations conducted by the repeaters 1 to 10 according to Embodiment 2 are similar to the operations of a repeater according to Embodiment 1 illustrated in FIG. 5. A main repeater other than the predetermined main repeater transmits information on a radio client device A to F whose location is registered to the predetermined main repeater in step S230, similarly to a sub-repeater.

Figure 8:
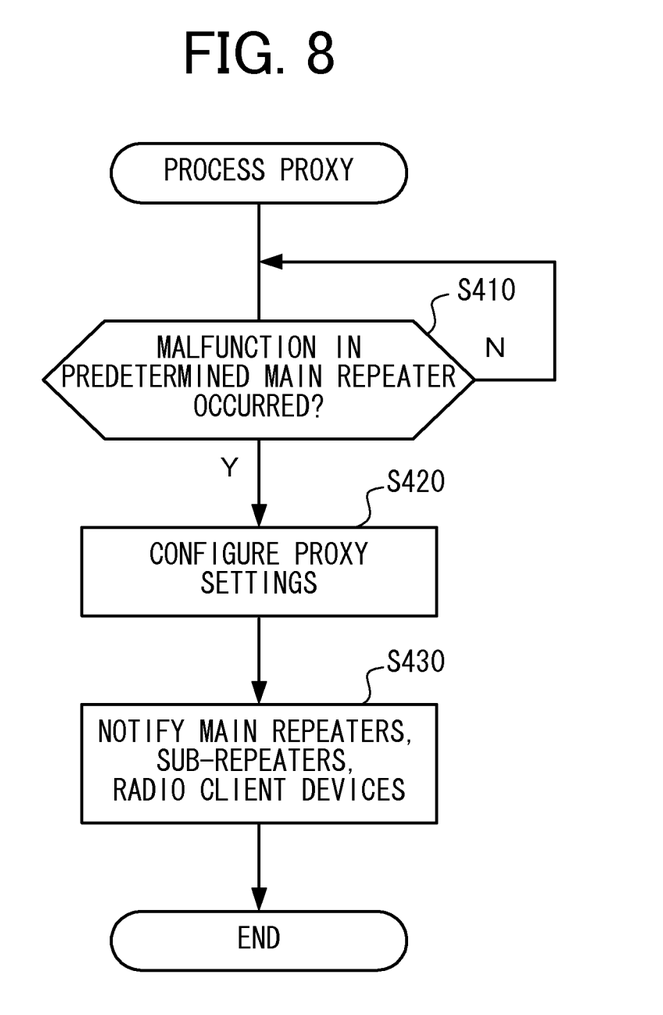
FIG. 8 is a flowchart illustrating an example of process proxy operations conducted by a repeater according to Embodiment 2.

FIG. 8 is a flowchart illustrating an example of process proxy operations conducted by a repeater according to Embodiment 2. The description below takes the main repeaters in the site 11 (that is, the repeater 1 and 2) as an example. The repeater 2, which is a main repeater of the site 11, stands by while determining, based on an information signal, that a malfunction has not occurred in the predetermined main repeater of the site 11 (that is, the repeater 1) (step S410; N), and repeats the processing in step S410. In the case of determining that a malfunction has occurred in the repeater 1 (step S410; Y), the repeater 2 sets the repeater 2 as the master repeater for the site 11, and configures proxy settings, setting the repeater 2 as the home repeater for radio client devices A to F having the repeater 1 set as the home repeater (step S420). The repeater 2 notifies the main repeaters of the sites 12 and 13 (that is, the repeaters 5 and 8), the sub-repeaters of the site 11 (that is, the repeaters 3 and 4), as well as radio client devices whose locations are registered in the site 11, that a malfunction has occurred in the repeater 1 (step S430).

As described above, according to the radio communication system 100 according to Embodiment 2, it becomes possible to shorten the time required by location registration processing for radio client devices A to F, and even in the case where a malfunction occurs in a predetermined main repeater, by having another main repeater execute processing as a proxy, it becomes possible to continue the location registration of the radio client devices A to F, the sharing of location registration information, repeater processing, and the like.

An embodiment of the present invention is not limited to the foregoing embodiments. The number of sites, the number of main repeaters, and the number of sub-repeaters are all arbitrary, and the number of main repeaters and the number of sub-repeaters constituting each site are also arbitrary.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

What is claimed is:

1. A radio communication system comprising:
a plurality of repeaters connected to each other via communication lines, each allocated with a unique channel; and
a plurality of radio client devices that communicate with each other via at least one of the plurality of repeaters;
wherein a plurality of communication areas are formed in which each of the plurality of radio client devices is capable of receiving a signal transmitted by multiple repeaters from among the plurality of repeaters in each communication area,
in each communication area, at least one predetermined repeater transmits a usage condition signal in a case where a channel allocated to the predetermined repeater is usable for communication,
each of the plurality of radio client devices scans a channel allocated to the predetermined repeater, and transmits a request for location registration to the predetermined repeater in a case of detecting the usage condition signal, and
the repeater, in a case of receiving a request for location registration from one of the plurality of radio client devices, conducts location registration for the radio client device, transmits information about the radio client device whose location is registered to a predetermined repeater in a communication area of the repeater or to a predetermined repeater in a different communication area, and in a case of receiving information about a radio client device whose location is registered from another repeater in the communication area of the repeater, transmits information about the radio client device whose location is registered to the predetermined repeater in the different communication area.

2. The radio communication system according to claim 1, wherein
the plurality of repeaters include a main repeater, being the predetermined repeater that transmits the usage condition signal, and a sub-repeater, being a repeater that does not transmit the usage condition signal,
each of the plurality of radio client devices scans a channel allocated to the main repeater, and in a case of detecting the usage condition signal, transmits a request for location registration to the main repeater, and in a case where the main repeater is in an unusable state and there is another main repeater or the sub-repeater in a communication area of the main repeater, additionally scans a channel allocated to the other main repeater or the sub-repeater, and in a case of detecting another usable repeater thereby, transmits a request for location registration to the other usable repeater,
the sub-repeater, in a case of receiving a request for location registration from one of the plurality of radio client devices, conducts location registration for the radio client device, and transmits information about the radio client device whose location is registered to a predetermined main repeater in a communication area of the sub-repeater, and
the main repeater, in a case of receiving a request for location registration from one of the plurality of radio client devices, conducts location registration for the radio client device, transmits information about the radio client device whose location is registered to a predetermined main repeater in the communication area of the main repeater or to a predetermined repeater in a different communication area, and in a case of receiving the information about a radio client device whose location is registered from the other main repeater or the sub-repeater in the communication area of the main repeater, transmits information about the radio client device whose location is registered to the predetermined repeater in the different communication area.

3. The radio communication system according to claim 2, wherein at least one of the plurality of communication areas includes a plurality of main repeaters that transmit and receive an information signal with each other, and the sub-repeater, and the main repeater, in a case of determining based on the information signal that a malfunction has occurred in a predetermined main repeater in a communication area of the main repeater, executes a process of the predetermined main repeater as a proxy.

4. The radio communication system according to claim 2, wherein each of the plurality of radio client devices scans a channel allocated to the predetermined main repeater, and in a case of detecting the usage condition signal, transmits a request for location registration to the predetermined main repeater, and in a case where the predetermined main repeater is in an unusable state and there is another main repeater in a communication area of the predetermined main repeater, transmits the request for location registration to the other main repeater, whereas in a case where the predetermined main repeater is in an unusable state and there is not another main repeater in the communication area of the predetermined main repeater, transmits the request for location registration to a sub-repeater in the communication area of the predetermined main repeater.

5. The radio communication system according to claim 1, wherein each of the plurality of radio client devices scans a channel allocated to the predetermined repeater in a last communication area where location registration occurred from among the plurality of communication areas, and in a case where a downlink signal strength of the predetermined repeater is at or above a threshold, and the usage condition signal is detected, transmits a request for location registration to the predetermined repeater, and in a case where the downlink signal strength is less than the threshold, scans a channel allocated to a predetermined repeater in another communication area.

6. The radio communication system according to claim 1, wherein the predetermined repeater, in a case of receiving a request for location registration from one of the plurality of radio client devices, conducts location registration for the radio client device, and transmits information about the radio client device whose location is registered to another repeater in a communication area of the predetermined repeater and to a predetermined repeater in a different communication area.

7. The radio communication system according to claim 6, wherein the predetermined repeater, in a case of receiving information about a radio client device whose location is registered from a predetermined repeater in a different communication area from the communication area of the predetermined repeater, transmits the information about a radio client device whose location is registered to another repeater in the communication area of the predetermined repeater.

8. The radio communication system according to claim 1, wherein the repeater includes:

a location register that, in a case of receiving a request for location registration from the radio client device, conducts location registration for the radio client device; and a transmitter that, in a case where the location registration of the radio client device is completed, transmits information about the radio client device whose location is registered to a predetermined other repeater in a communication area in which the radio client device is capable of receiving a signal transmitted by the repeater, or to a predetermined other repeater in a different communication area, and in a case of receiving information about a radio client device whose location is registered from another repeater in the communication area of the repeater, transmits information about the radio client device whose location is registered to the predetermined other repeater in the different communication area.

9. The radio communication system according to claim 8, wherein the communication area includes a plurality of repeaters that transmit and receive an information signal with each other, and the repeater further comprising:

a proxy processor that, in a case of determining based on the information signal that a malfunction has occurred in another repeater in the communication area, executes a process of the other repeater as a proxy.

10. The radio communication system according to claim 8, wherein in the case of receiving a request for location registration from the radio client device, the location register conducts location registration for the radio client device, and the transmitter transmits the information about the radio client device whose location is registered to another repeater in the communication area of the current repeater and to a predetermined repeater in a different communication area.

11. The radio communication system according to claim 10, wherein in a case of receiving information about a radio client device whose location is registered from a predetermined repeater in a different communication area from the communication area of the current repeater, the transmitter transmits the information about a radio client device whose location is registered to another repeater in the communication area of the current repeater.

12. A location registration method conducted by a radio communication system comprising a plurality of repeaters connected to each other via communication lines, each allocated with a unique channel, and a plurality of radio client devices that communicate with each other via at least one of the plurality of repeaters, wherein a plurality of communication areas are formed in which each of the plurality of radio client devices is capable of receiving a signal transmitted by multiple repeaters from among the plurality of repeaters in each communication area, and in each communication area, at least one predetermined repeater transmits a usage condition signal in a case where a channel allocated to the predetermined repeater is usable for communication, the location registration method comprising:

each of the plurality of radio client devices conducting a location registration requesting step of scanning a channel allocated to the predetermined repeater, and in a case of receiving, on the channel, the usage condition signal that matches a predetermined reference, transmitting a request for location registration to the predetermined repeater; and the repeater conducting a location registering step of, in a case of receiving a request for location registration from one of the plurality of radio client devices, conducting location registration for the radio client device, transmitting information about the radio client device whose location is registered to a predetermined repeater in a communication area of the repeater or to a predetermined repeater in a different communication area, and in a case of receiving information about a radio client device whose location is registered from another repeater in the communication area of the repeater, transmitting information about the radio client device whose location is registered to the predetermined repeater in the different communication area.

13. A radio client device that communicates with another radio client device via at least one of a plurality of repeaters that are connected to each other via communication lines and are each allocated with a unique channel,
wherein a communication area is formed in which the radio client device is capable of receiving a signal transmitted by multiple repeaters from among the plurality of repeaters, and in a case where there exists, in the communication area, a main repeater, being a predetermined repeater that transmits a usage condition signal in a case where an allocated channel is usable for communication, and a sub-repeater, being a repeater that is not the main repeater,
the radio client device comprising:
a scanner that scans a channel allocated to the main repeater; and
a transmitter that, in a case of receiving the usage condition signal, transmits a request for location registration to the main repeater,
wherein, in a case where the main repeater is in an unusable state and there is another main repeater or the sub-repeater in the communication area, the scanner additionally scans a channel allocated to the other main repeater or the sub-repeater, and in a case of detecting another usable repeater thereby, the transmitter transmits a request for location registration to the other usable repeater.

14. The radio client device according to claim 13, wherein
a plurality of communication areas are formed in which the radio client device is capable of receiving a signal transmitted by multiple repeaters from among the plurality of repeaters in each communication area, and in a case where there exists, in each of the plurality of communication areas, a main repeater, being a predetermined repeater that transmits the usage condition signal, and a sub-repeater, being a repeater that is not the main repeater,
the scanner scans a channel allocated to a main repeater in a last communication area where location registration occurred from among the plurality of communication areas, and in a case where a downlink signal strength of the main repeater is at or above a threshold, and the usage condition signal is detected, the transmitter transmits a request for location registration to the main repeater, and in a case where the downlink signal strength is less than the threshold, the scanner scans a channel allocated to a main repeater in another communication area.

15. The radio client device according to claim 13, wherein
the scanner scans a channel allocated to the main repeater, and in a case of receiving the usage condition signal, the transmitter transmits a request for location registration to the main repeater, and in a case where the main repeater is in an unusable state and there is another main repeater in the communication area, the transmitter transmits the request for location registration to the other main repeater, whereas in a case where the main repeater is in an unusable state and there is not another main repeater in the communication area, the transmitter transmits the request for location registration to a sub-repeater in the communication area.

* * * * *